United States Patent
Nishikawa

[19]

[11] Patent Number: 6,128,270
[45] Date of Patent: *Oct. 3, 2000

[54] OPTICAL INFORMATION RECORDING MEDIUM CAPABLE OF RECORDING INFORMATION ON BOTH TRACK GUIDE GROOVES AND LANDS AND OPTICAL INFORMATION REPRODUCING APPARATUS FOR OPTICAL INFORMATION RECORDING MEDIUM

[75] Inventor: Koichiro Nishikawa, Takasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/935,906

[22] Filed: Sep. 23, 1997

[30] Foreign Application Priority Data

Sep. 26, 1996 [JP] Japan .................................. 8-254829

[51] Int. Cl.$^7$ ........................................................ G11B 7/00
[52] U.S. Cl. ...................................... 369/275.4; 369/44.26
[58] Field of Search .......................... 369/275.4, 116, 369/44.26, 44.37, 275.1

[56] References Cited

U.S. PATENT DOCUMENTS

| | | |
|---|---|---|
| 4,783,776 | 11/1988 | Ishigaki et al. . |
| 5,040,165 | 8/1991 | Taii et al. .............................. 369/275.4 |
| 5,144,552 | 9/1992 | Abe ........................................ 369/275.4 |
| 5,353,274 | 10/1994 | Nishikawa ............................... 369/121 |
| 5,398,232 | 3/1995 | Omata .................................... 369/275.4 |
| 5,463,610 | 10/1995 | Nishikawa ............................... 369/121 |
| 5,477,524 | 12/1995 | Deguchi et al. ...................... 369/275.1 |
| 5,557,601 | 9/1996 | Nishikawa ............................... 369/121 |
| 5,581,539 | 12/1996 | Horie et al. ........................... 369/275.4 |
| 5,583,847 | 12/1996 | Takeshima et al. .................. 369/275.4 |
| 5,586,097 | 12/1996 | Nishikawa ............................... 369/112 |
| 5,625,618 | 4/1997 | Oki ........................................ 369/275.1 |
| 5,657,305 | 8/1997 | Sasaki et al. ............................ 369/110 |
| 5,671,199 | 9/1997 | Nishikawa ............................ 369/44.26 |
| 5,696,758 | 12/1997 | Yanagimachi et al. ............... 369/275.4 |
| 5,777,980 | 7/1998 | Adachi ................................. 369/275.4 |
| 5,926,446 | 7/1999 | Shimizu ................................ 369/44.26 |

FOREIGN PATENT DOCUMENTS 5-282705   10/1993   Japan .

*Primary Examiner*—Tan Dinh
*Assistant Examiner*—Kim-Kwok Chu
*Attorney, Agent, or Firm*—Fitzpatrick, Cella, Harper & Scinto

[57] ABSTRACT

An optical information recording medium from which information is reproduced by a light beam having a spot diameter a includes track guide grooves and lands formed into recesses/projections, and pre-pits indicating the addresses of the track guide grooves and the lands. The width of the pre-pits is 0.2 a (inclusive) to 0.5 a (exclusive), and a pitch T of the track guide grooves is given by 0.7 a<T/2<0.8 a.

6 Claims, 7 Drawing Sheets

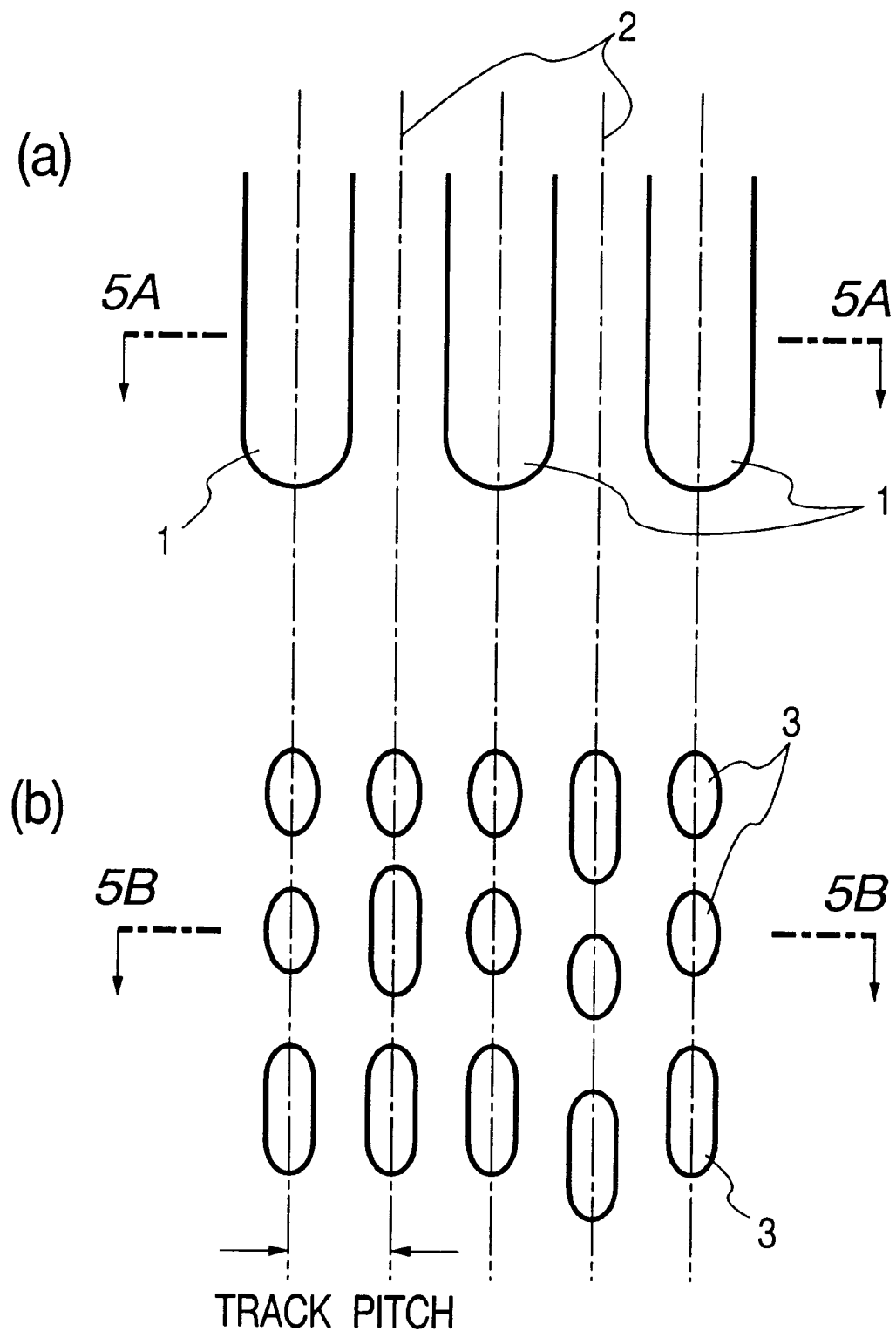

OPTICAL INFORMATION RECORDING MEDIUM CAPABLE OF RECORDING INFORMATION ON BOTH TRACK GUIDE GROOVES AND LANDS AND OPTICAL INFORMATION REPRODUCING APPARATUS FOR OPTICAL INFORMATION RECORDING MEDIUM

BACKGROUND OF THE INVENTION

1. Field of the Invention

The present invention relates to an optical information recording medium and an optical information reproducing apparatus and, more particularly, to an optical information recording medium capable of recording signals on both track guide grooves and lands which are formed into recesses and projections in advance.

2. Related Background Art

In recent years, in optical information recording/reproducing apparatuses using optical information recording media, research and development of high-density recording/reproducing techniques have been enthusiastically made. Conventionally, information has been recorded on track guide grooves (to be referred to as guide grooves hereinafter) or lands between the guide grooves. Recently, however, research and development of a method of also recording signals between the information tracks of a conventional recording medium have been widely made. This method is generally called land/groove recording. This technique is, however, facing the serious problem of how to suppress feedthrough of signals from adjacent tracks (to be referred to as "crosstalk" hereinafter).

A technique of reducing crosstalk by the interference effect produced by forming guide grooves to a depth of about $\lambda/5$ is disclosed in Japanese Patent Application Laid-Open No. 5-282705.

With regard to address pre-pits, which have the form of recesses/projections, a reduction in crosstalk by an interference effect cannot be expected. For this reason, according to Japanese Patent Application Laid-Open No. 5-282705, address pre-pits are alternately formed in both lands and guide grooves so as not to be adjacent to each other, thereby preventing crosstalk (FIG. 1). As an address pre-pit uses the false reflectivity of a recess, i.e., a change in phase, it has a greater influence on reproduction of an adjacent track than an information recording pit. In this prior art, therefore, no address pre-pits are formed in the guide grooves on both sides of information recording pits 813, and the nearest address pre-pits are address pre-pits 812 and 814 in next lands 802 and 804. With this arrangement, when a laser beam is irradiated on address pre-pits, the address pre-pits in both sides of the information recording pits scarcely affect the information recording pits.

In the above prior art, since address pre-pits are formed in both lands and guide grooves, the manufacturing process for a disk substrate is complicated as compared with a typical recording medium in which guide grooves and guide groove pre-pits or land pre-pits are formed. In addition, in the prior art, there are three different values set in the direction of depth (see the sectional views of FIGS. 2C and 2D), while in a typical recording medium, there are two different values in the direction of depth, i.e., the values of each guide groove portion and each pit portion, and hence the disk substrate itself is very difficult to manufacture. Furthermore, if information is recorded on a track region adjacent to address pre-pits, this information recording region becomes adjacent to the address region. As a result, crosstalk from the pre-pits in the adjacent address region poses a problem in reproduction of the information on the information recording region. If this region is set as an unused region, the recording region decreases accordingly, interfering with the realization of a large-capacity recording medium.

SUMMARY OF THE INVENTION

The present invention has been made in consideration of the above problem in the prior art, and has as its object to provide an optical information recording medium which is used for land/groove recording, allows easy manufacture of a substrate, and attains a sufficient reduction in crosstalk even in an arrangement in which address pre-pits are adjacent to each other, and an optical information reproducing apparatus using the same.

In order to achieve the above object, there is provided an optical information recording medium from which information is reproduced by a light beam having a spot diameter a, comprising track guide grooves and lands formed into recesses/projections, and pre-pits indicating addresses of the track guide grooves and the lands, wherein a width of the pre-pits is from 0.2a (inclusive) to 0.5a (exclusive), and a pitch T of the track guide grooves is given by $$0.7\,a < T/2 < 0.8\,a$$

In addition, the above object is achieved by an optical information reproducing apparatus for reproducing information from the optical information recording medium.

These medium and apparatus will be described in detail in the following detailed description of the embodiment.

BRIEF DESCRIPTION OF THE DRAWINGS

FIGS. 2A, 2B, 2C, 2D and 2E are views for comparing and explaining optical information recording media according to the present invention and the prior art, in which FIG. 2A is a schematic plan view of part of the conventional disk, FIG. 2B is a schematic plan view of part of the optical disk of the present invention, FIGS. 2C and 2D are sectional views of the conventional disk, and FIG. 2E is a sectional view of the optical disk of the present invention;

FIGS. 4(*a*) and 4(*b*) are plan views showing the optical information recording medium of the present invention when viewed from the optical head side;

DETAILED DESCRIPTION OF THE PREFERRED EMBODIMENTS

Figure 5A:
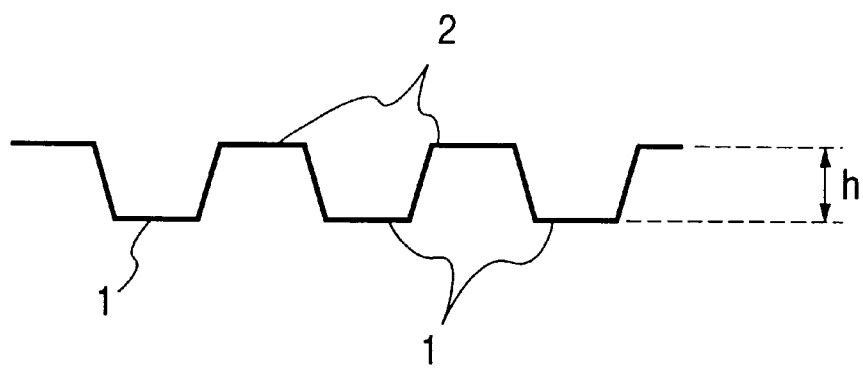
FIGS. 5A and 5B are sectional views of the optical information recording medium of the present invention.
Figure 5B:
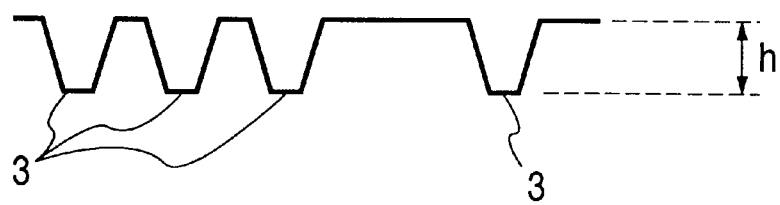

The present invention will be described below with reference to the accompanying drawings. FIGS. 4, 5A and 5B show the concept of an optical information recording medium (optical disk) of the present invention. FIG. 4 is a plan view of the medium viewed from the optical head side. FIG. 5A is a sectional view taken along a line 5A—5A in FIG. 4. FIG. 5B is a sectional view taken along a line 5B—5B in FIG. 4.

As shown in FIGS. 5A and 5B, a guide groove 1, a pre-pit 3 on the extended line of the guide groove 1, and a pre-pit 3 on the extended line of a land 2 all have the same depth, i.e., a depth h. This depth h is set to a value that reduces crosstalk by an interference effect.

Figure 1:
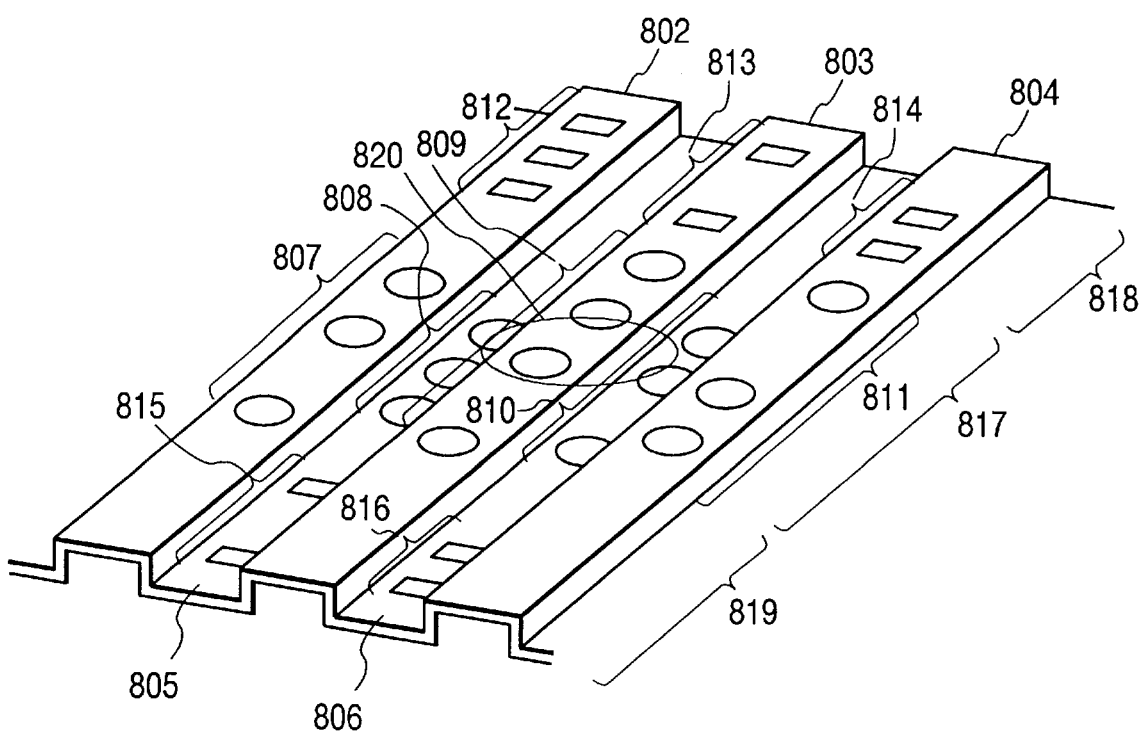
FIG. 1 is a perspective view for explaining a conventional optical information recording medium.
Figure 2A:
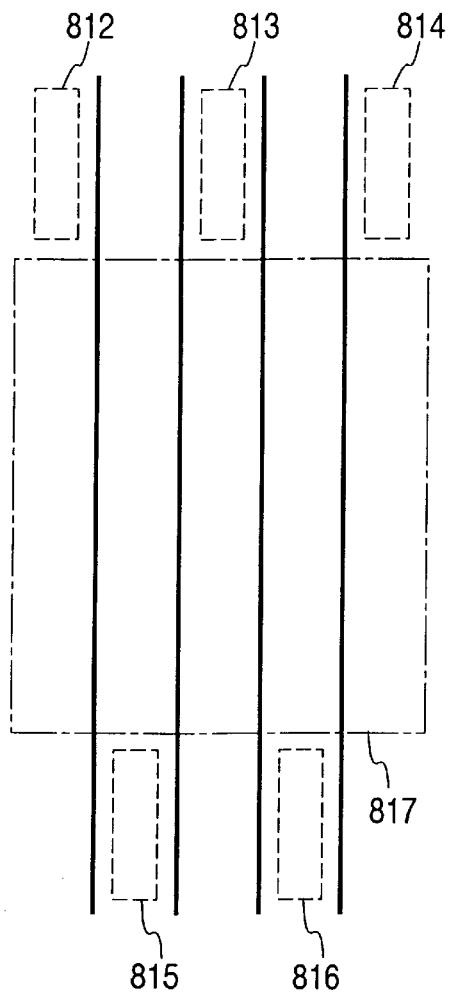
Figure 2B:
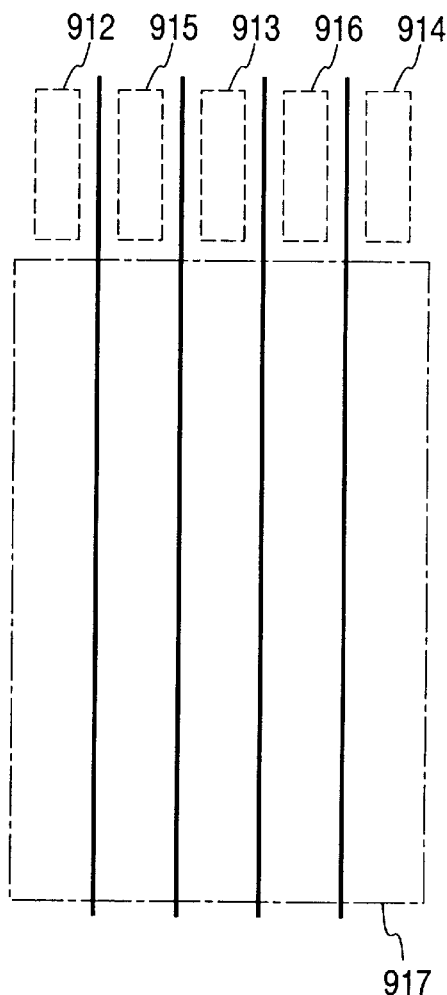
Figure 2C:
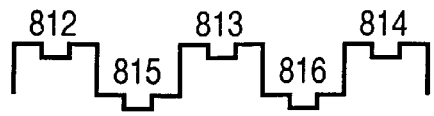
Figure 2E:
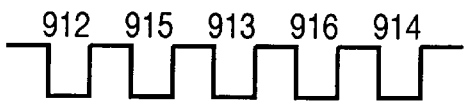
Figure 2D:
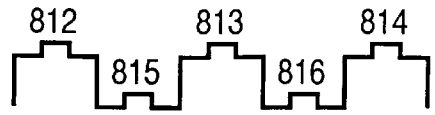

FIGS. 2A to 2E are views for comparing and explaining the optical disks according to the present invention and the prior art. FIGS. 2A and 2B are schematic plan views respectively showing parts of the optical disks according to the prior art and the present invention. The dotted line regions indicate address pre-pit regions; and the chain line regions, information recording regions. FIGS. 2C and 2D are sectional views of the conventional optical disk shown in FIG. 2A. FIG. 2E is a sectional view of the optical disk of the present invention shown in FIG. 2B. As is obvious from FIGS. 2A to 2E, in the present invention, since address pre-pit regions are arranged side by side, there is no wasteful region. An information recording region 917 is therefore larger than the corresponding region of the conventional optical disk. In addition, all regions have the same value of depth.

Figure 3B:
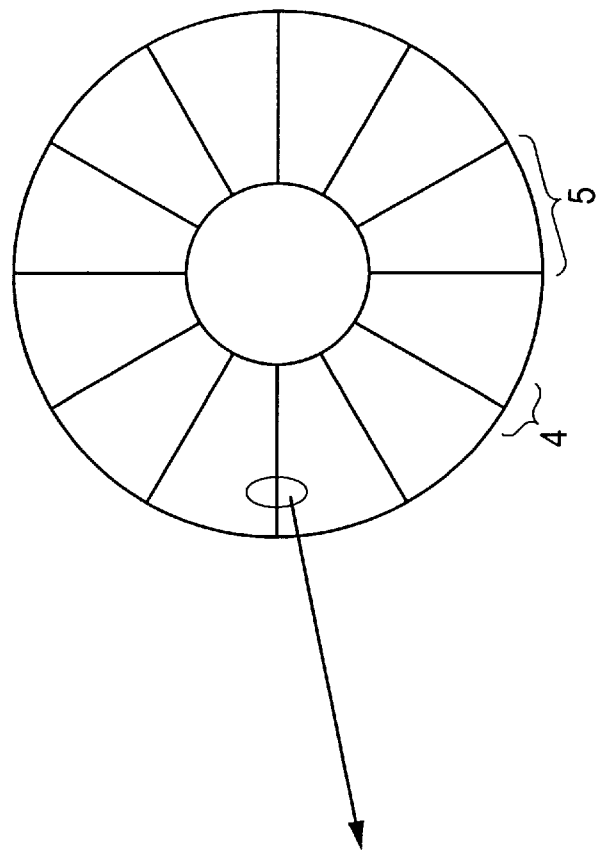
FIGS. 3A and 3B are schematic views showing the optical information recording medium of the present invention.
Figure 3A:
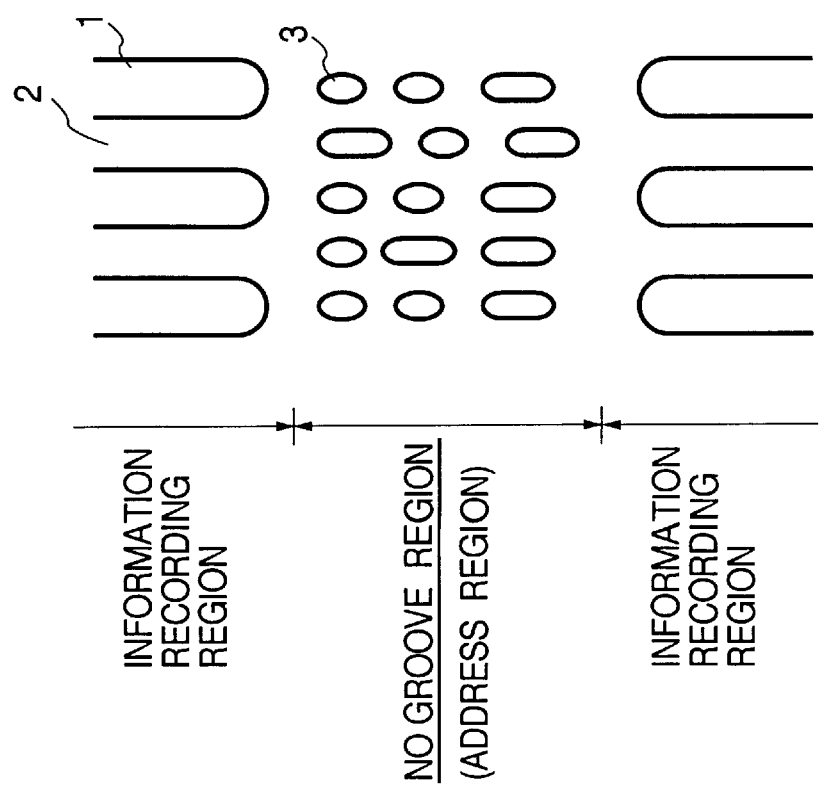

FIGS. 3A and 3B are schematic views for explaining a no groove region on the optical disk of the present invention. FIG. 3A is an enlarged view of a portion near a no groove region on the optical disk in FIG. 3B. FIG. 3A shows the length of the no groove portion at a ratio equal to or lower than 1/10 the actual ratio (to the length of a pit). No groove regions (grooveless regions) equal in number to N information recording regions formed on the surface of the optical disk over one circumference are formed between the information recording regions. Information is actually recorded on the regions other than the no groove regions.

A recording/reproducing spot will be described next. A semiconductor laser with a wavelength of 650 nm was used, with the NA of the objective lens being set to 0.60, to form a recording/reproducing spot with D/W≅0.85 where D is the incident pupil diameter of the objective lens and W is the diameter of a light beam corresponding to $1/e^2$ the peak intensity in the incident light beam intensity distribution. With this setting, the spot diameter on the medium surface was almost 0.95 μm.

Figure 6:
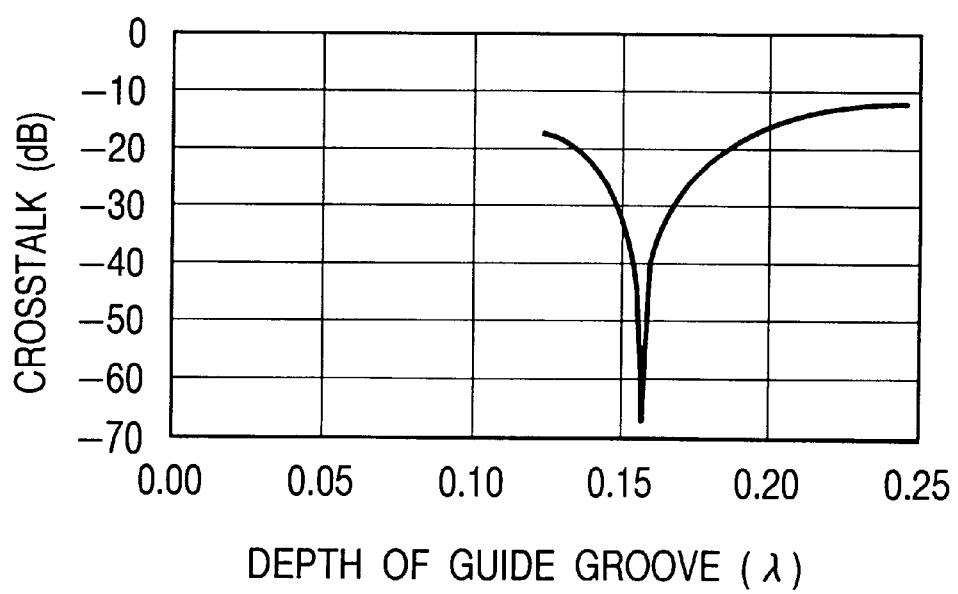
FIG. 6 is a graph showing the relationship between crosstalk and the depth of a guide groove.

Information was recorded on a phase change medium with a track pitch of 0.66 μm by using this spot. FIG. 6 shows the relationship between crosstalk and the depth of a guide groove upon reproduction of the recorded marks. Referring to the graph of FIG. 6, the depth of a guide groove is shown with respect to a wavelength λ of the recording/reproducing spot. The crosstalk is defined as follows. Assume that a long mark (about 2.42 μm) is formed on an adjacent track, and a shortest mark (about 0.66 μm) is formed on a track being reproduced. Letting $I_0$ be the level of the shortest mark upon reproduction thereof, and $I_1$ be the level of feedthrough from the adjacent track, crosstalk=20×$\log_{10}(I_1/I_0)$ An examination of FIG. 6 indicates that the depth of a pre-pit and a guide groove is preferably set near the groove depth at which the crosstalk in FIG. 6 is minimized, i.e., about 0.16λ.

Figure 7:
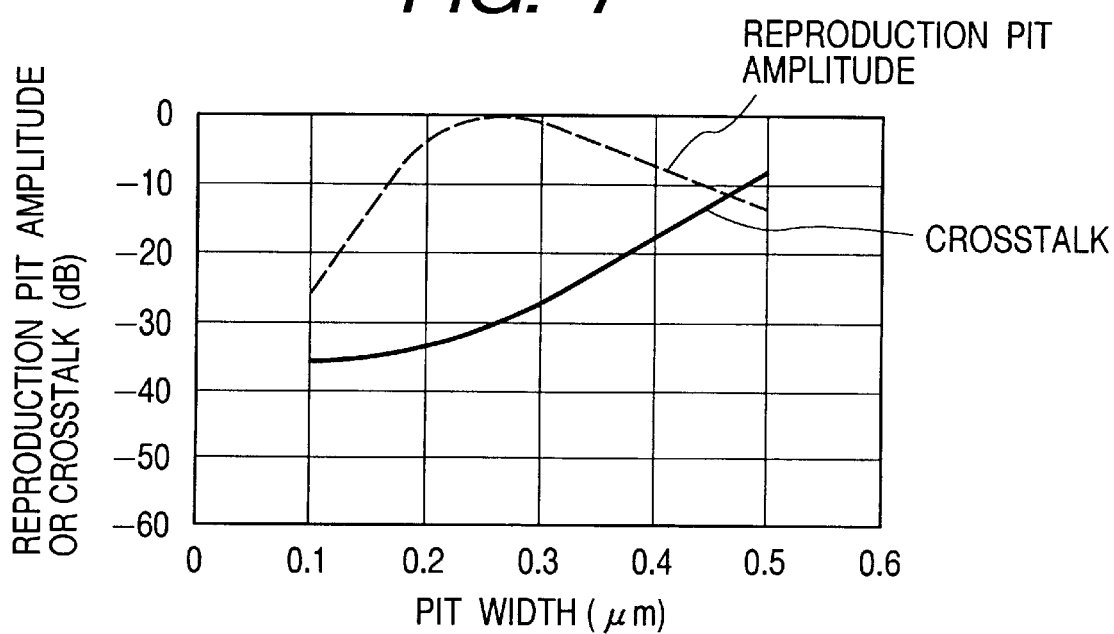
FIG. 7 is a graph showing the relationship between the pit width, crosstalk, and the reproduction pit amplitude.

FIG. 7 is a graph showing the relationship between the pit width, crosstalk, and the reproduction pit amplitude in reproduction of pre-pits with a track pitch of 0.66 μm. Referring to FIG. 7, the solid line represents the crosstalk; and the dotted line, the reproduction pit amplitude. The reproduction pit amplitude is plotted with almost the maximum amplitude value being 0 dB.

Figure 8:
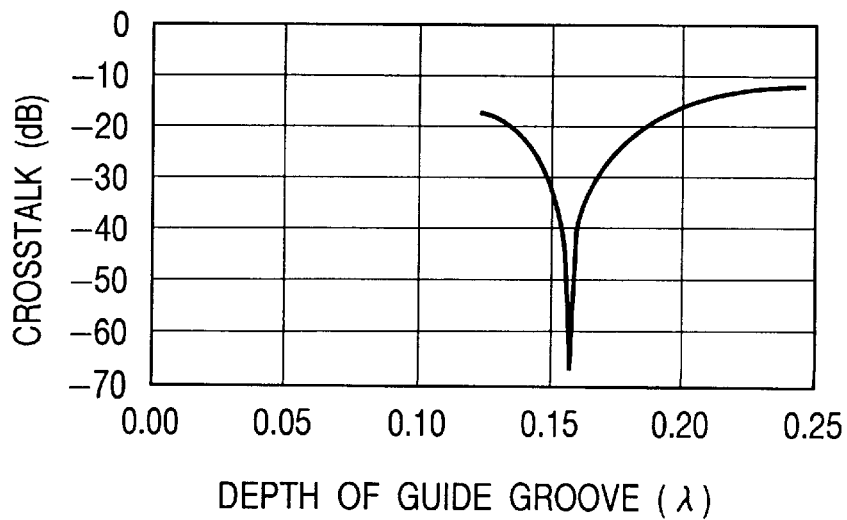
FIG. 8 is a graph showing the relationship between crosstalk and the depth of a guide groove.
Figure 9:
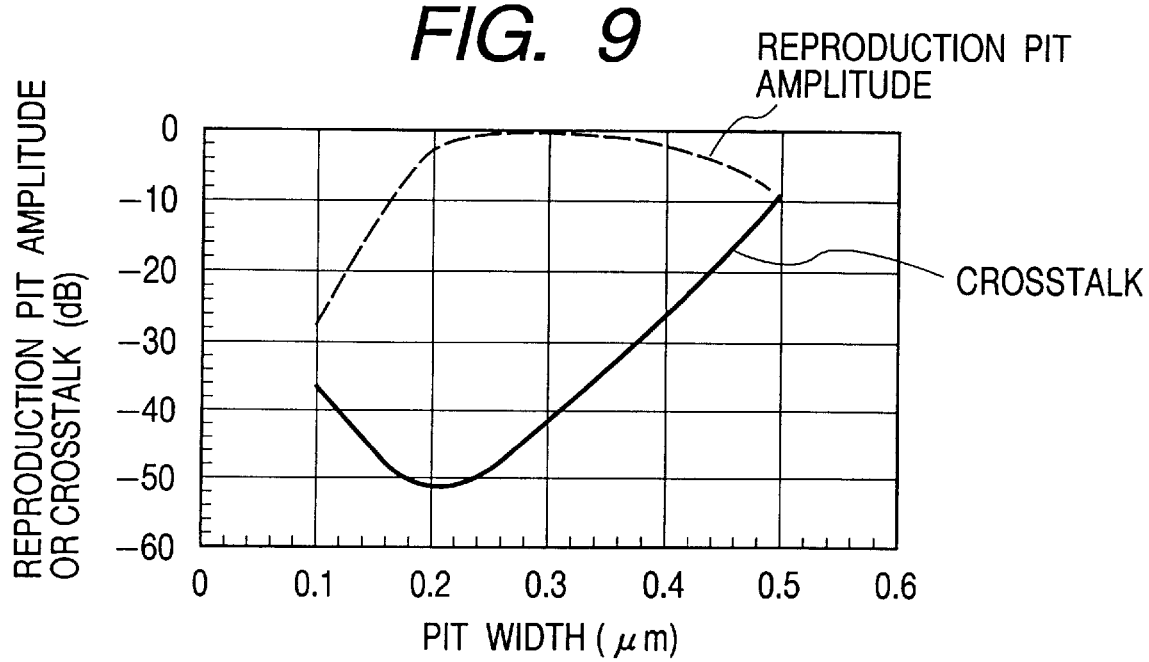
FIG. 9 is a graph showing the relationship between the pit width, crosstalk, and the reproduction pit amplitude.

Similarly, FIGS. 8 and 9 are graphs respectively showing the relationship between crosstalk and the depth of a guide groove and the relationship between the pit width, crosstalk, and the reproduction pit amplitude in a case wherein the same recording/reproducing spot and a medium with a track pitch of 0.74 μm are used.

The depth of a guide groove at which crosstalk is minimized when a mark is recorded/reproduced will be examined. In forming a guide groove in a disk like the one described above, it suffices if a mechanical depth error of about ±5 nm is expected. According to the graphs of FIGS. 6 and 8, as the depth of a guide groove is set in optical path length terms, a depth of 5 nm is multiplied by the refractive index of the substrate to correspond approximately ±8 nm.

The oscillation wavelength of a typical semiconductor laser varies. If, for example, λ=600 to 900 nm, a variation of about ±20 nm, including a deviation with a change in temperature, may be expected. According to the graphs of FIGS. 6 and 8, since λ=650 nm, the variation corresponds to an error of about 3%. Since 0.16λ is the depth of a guide groove at which the crosstalk is minimized, the variation corresponds to an error of about ±0.005λ (≅±3.3 nm).

As described above, in practice, as an error with respect to the depth of a guide groove at which the crosstalk is minimized, an error of about ±12 nm in optical path length terms, i.e., an error of about ±λ/50, must be expected.

According to the graphs of FIGS. 6 and 8, the crosstalk produced when marks are recorded/reproduced within the above error range of the depth of a guide groove is about −22 dB or less. Since the crosstalk during reproduction of pre-pits is preferably equal to or less than the upper limit (−22 dB) of crosstalk during reproduction of marks, it suffices if the pit width is set to be smaller than a predetermined value (−22 dB), according to the graphs of FIGS. 6 and 8.

Figure 10:
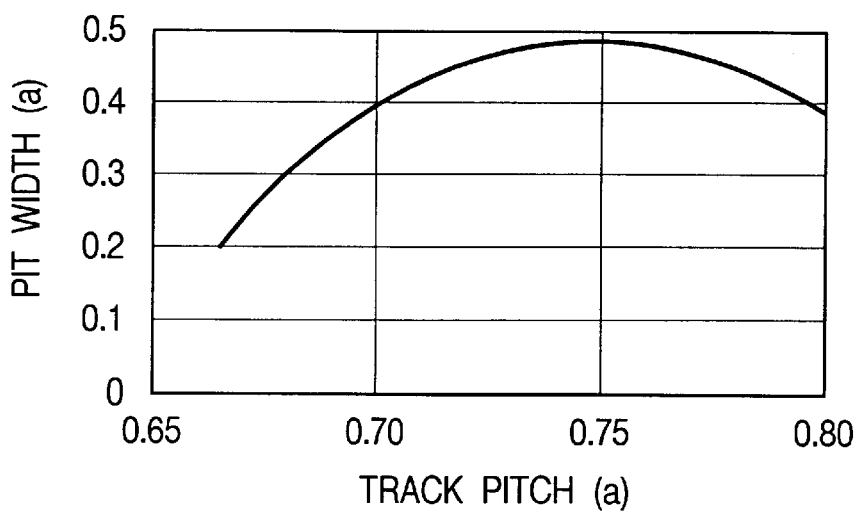
FIG. 10 is a graph showing the relationship between the track pitch of the optical information recording medium and the upper limit of the corresponding pit width.

FIG. 10 is a graph showing the relationship (based on the above idea) between the track pitch and the upper limit (the above predetermined value) of the corresponding pit width. Both the track pitch and the bit width are normalized with the recording/reproducing spot diameter. According to the graph of FIG. 10, the upper limit of the pit width is preferably 0.5 a or less.

The reproduction pit amplitude will be considered next. In the case of the above phase change medium, the reflectivity of a portion having no mark is 30 to 40%, and the reflectivity difference between a portion having no mark and a portion having a mark is about 10 to 20%. In this case, when the reproduction pit amplitude is optimized in terms of itself, the amplitude becomes about two times the mark reproduction amplitude. The allowable value of the reproduction pit amplitude is therefore ½ the reproduction pit amplitude optimized in terms of itself, i.e., about −6 dB, as can be seen from FIGS. 7 and 9. According to the graphs of FIG. 9, it suffices if the pit width falls within a predetermined range.

According to the above idea, as is obvious from the graphs of FIGS. 7 and 9, it suffices if the pit width is equal to or smaller than the upper limit of the pit width shown in the graph of FIG. 10 and equal to or larger than 0.18 μm within the track pitch range in FIG. 10. When this value is expressed by the value normalized with the recording/reproducing spot diameter, it suffices if the pit value is 0.19 a or more, i.e., about 0.2 a or more.

As described above, when the track pitch (½ the track guide groove pitch) is 0.7 a to 0.8 a ((0.66/0.95) a to (0.74/0.95) a), the pit width is preferably less than 0.5 a from the viewpoint of crosstalk, more preferably 0.33 a or less, and is preferably 0.2 a or more from the viewpoint of reproduction pit amplitude. The following are the numerical values actually used in the Examples of the embodiment.

TABLE 1

|  | Wave-length (nm) | Spot Diameter (μm) | Groove Depth (μm) | Track Pitch (μm) | Pit Width (μm) |
| --- | --- | --- | --- | --- | --- |
| Example 1 | 650 | 0.95 | 0.106 | 0.66 | 0.25 |
| Example 2 | 650 | 0.95 | 0.104 | 0.70 | 0.27 |
| Example 3 | 650 | 0.95 | 0.102 | 0.74 | 0.29 |

As obvious from the above description, according to the present invention, no groove regions are formed on the track of a land/groove recording medium, and pre-pits are formed in the no groove regions to the same depth as that of guide grooves. With this arrangement, the manufacture of the substrate is facilitated. In addition, since the relationship between the recording/reproducing spot diameter, the track pitch, and the pit width is properly set, crosstalk can be sufficiently reduced even in an arrangement in which address pre-pits are adjacent to each other.

What is claimed is:

1. An optical information recording medium from which information is reproduced by a light beam having a spot diameter a, comprising:

first and second tracks comprising as a part thereof track guide grooves and lands, respectively, formed into recesses/projections, both said track guide grooves and said lands bearing information recorded thereon; and pre-pits indicating addresses of said track guide grooves and said lands, said pre-pits being formed on other portions not bearing information than said track guide grooves and said lands, respectively, of both said first and second tracks, wherein a width of said pre-pits is from 0.2 a to 0.5 a, and a pitch T of said track guide grooves is given by 0.7 a<T/2<0.8 a.

2. A medium according to claim 1, wherein a depth of said guide grooves is equal to a depth of said pre-pits.

3. A medium according to claim 2, wherein when a wavelength of the light beam is represented by $\lambda$, the depth is $0.16\lambda$.

4. A medium according to claim 1, wherein the width of the pre-pits is from 0.2 a to 0.33 a.

5. A medium according to claim 1, wherein said pre-pits are formed in regions which do not have said track guide grooves.

6. An optical information reproducing apparatus comprising a device for reproducing information using a light beam having a spot diameter of a from an optical information recording medium comprising first and second tracks, comprising as part thereof track guide grooves and lands respectively formed into recesses/projections, both said track guide grooves and said lands bearing information recorded thereon, and pre-pits indicating addresses of the track guide grooves and lands, said pre-pits being formed on other portions not bearing information than said track guide grooves and said lands, respectively, of both said first and second tracks wherein a width of the pre-pits is from 0.2 a to below 0.5 a, and a pitch T of the track guide grooves is given by 0.7 a<T/2<0.8 a.

* * * * *

UNITED STATES PATENT AND TRADEMARK OFFICE
CERTIFICATE OF CORRECTION

PATENT NO. : 6,128,270
DATED : October 3, 2000
INVENTOR(S) : Koichiro Nishikawa

It is certified that error appears in the above-identified patent and that said Letters Patent is hereby corrected as shown below:

Column 2,
Line 25, "$0.7a<T/2<0.8a$" should read -- $0.7a \leq T/2 \leq 0.8a$ --;

Column 6,
Line 7, "$0.7a<T/2<0.8a$." should read -- $0.7a \leq T/2 \leq 0.8a$. --;
Line 34, "$0.7a<T/2<0.8a$." should read -- $0.7a \leq T/2 \leq 0.8a$. --.

Signed and Sealed this

Twenty-third Day of October, 2001

Attest:

NICHOLAS P. GODICI

*Attesting Officer*          *Acting Director of the United States Patent and Trademark Office*